US008908473B2

(12) United States Patent
Bradford

(10) Patent No.: US 8,908,473 B2
(45) Date of Patent: Dec. 9, 2014

(54) METHOD OF SUBSURFACE IMAGING USING MICROSEISMIC DATA

(75) Inventor: Ian Bradford, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 1401 days.

(21) Appl. No.: 12/342,688

(22) Filed: Dec. 23, 2008

(65) Prior Publication Data

US 2010/0157730 A1    Jun. 24, 2010

(51) Int. Cl.
*G01V 1/30* (2006.01)

(52) U.S. Cl.
CPC ........................................ *G01V 1/30* (2013.01)
USPC ..................... 367/38; 367/73; 702/11; 702/18

(58) Field of Classification Search
CPC ....................................................... G01V 1/30
USPC ............ 367/38, 73; 702/16, 18, 6, 14, 57, 11; 703/6, 10, 2; 175/39, 40, 50
See application file for complete search history.

(56) References Cited

U.S. PATENT DOCUMENTS

| | | | |
|---|---|---|---|
| 4,969,130 A | 11/1990 | Wason et al. | |
| 5,377,104 A | 12/1994 | Sorrells et al. | |
| 5,777,477 A | 7/1998 | Wynn | |
| 6,278,949 B1 | 8/2001 | Alam | |
| 6,292,754 B1 | 9/2001 | Thomsen | |
| 6,317,695 B1 | 11/2001 | Zhou et al. | |
| 6,462,549 B1 | 10/2002 | Curtis et al. | |
| 6,766,254 B1 | 7/2004 | Bradford | |
| 6,856,575 B2 | 2/2005 | Jones | |
| 6,904,365 B2 | 6/2005 | Bratton | |
| 6,947,843 B2 | 9/2005 | Fisher | |
| 6,981,550 B2 | 1/2006 | Haheim | |
| 6,985,816 B2 | 1/2006 | Sorrells | |
| 7,043,410 B2* | 5/2006 | Malthe-Sorenssen et al. | ... 703/2 |
| 7,181,380 B2 | 2/2007 | Dusterhoft | |
| 7,258,175 B2* | 8/2007 | Veeningen et al. | ............. 175/40 |
| 7,421,345 B2 | 9/2008 | Tabarovsky | |
| 7,457,194 B2 | 11/2008 | Prioul | |

(Continued)

FOREIGN PATENT DOCUMENTS

| | | |
|---|---|---|
| GB | 2354852 A1 | 4/2001 |
| GB | 2439571 A | 1/2008 |

(Continued)

OTHER PUBLICATIONS

Rutledge et al. "Faulting Induced by Forced Fluid Injection and Fluid Flow Forced by Faulting: An Interpretation of Hydraulic-Fracture Microseismicity, Carthage Cotton Gas Field, Texas," Bulletin of the Seismological Society of America, vol. 94, No. 5, pp. 1817-1830, Oct. 2004.*

(Continued)

*Primary Examiner* — Daniel L Murphy

(57) ABSTRACT

A method of subsurface imaging is disclosed, the method involving using input data relating to the geometry of a fracture in a subsurface medium, mechanical properties of the medium and in-situ stress states in the medium, to model the behavior of the fracture and obtain predicted information relating to deformation of the fracture. The predicted information is then used to constrain the interpretation of measured microseismic data caused by movement of the fracture to determine characteristics of the movement and/or failure of the fracture.

12 Claims, 8 Drawing Sheets

(56) References Cited

U.S. PATENT DOCUMENTS

| | | | |
|---|---|---|---|
| 7,460,436 | B2 | 12/2008 | Segall |
| 7,603,265 | B2 | 10/2009 | Mainguy |
| 7,629,791 | B2 | 12/2009 | Bespalov |
| 7,647,183 | B2 | 1/2010 | Jechumtalova et al. |
| 7,872,944 | B2 | 1/2011 | Eisner |
| 7,946,340 | B2 * | 5/2011 | Surjaatmadja et al. ..... 166/250.1 |
| 2004/0100263 | A1 | 5/2004 | Fanini et al. |
| 2005/0190649 | A1* | 9/2005 | Eisner et al. ................... 367/38 |
| 2007/0234787 | A1 | 10/2007 | Rabinovich et al. |
| 2007/0272407 | A1 | 11/2007 | Lehman et al. |
| 2007/0274155 | A1 | 11/2007 | Ikelle |
| 2008/0004847 | A1 | 1/2008 | Bradford |

FOREIGN PATENT DOCUMENTS

| | | | |
|---|---|---|---|
| WO | 2004070424 | A1 | 8/2004 |
| WO | 2005006020 | A1 | 1/2005 |
| WO | 2009022092 | A1 | 2/2009 |
| WO | 2009108432 | A1 | 9/2009 |
| WO | WO2009108432 | A1 * | 9/2009 |

OTHER PUBLICATIONS

Aki et al.: "Representation of seismic sources," Quantitative Seismology, second edition, University Science Books, Sausalito, California 2002, chapter 3, pp. 37-62.

Ali et al.: "Watching rocks change—mechanical earth modeling," Schlumberger Oilfield Review, Summer 2003, pp. 22-39.

Bartberger et al.: "Is there a basin-centered gas accumulation in Cotton Valley Group Sandstones, Gulf Coast Basin, U.S.A.?," U.S. Geological Survey Bulletin 2184-D, U.S. Department of Energy, National Energy Technology Laboratory, Morgantown, W. Va., Feb. 2002.

Cai et al.: "A Matlab implementation of internal deformation field for static stress triggering calculation," Earthquake Hazard, risk and strong ground motion, IUGG Special Edition, 2004, pp. 191-203.

Dahm et al.: "Automated moment tensor inversion to estimate source mechanisms of hydraulically induced micro-seismicity in salt rock," Tectonophysics, 306, 1999, pp. 1-17.

Dake: "Some basic concepts in reservoir engineering," Fundamentals of Reservoir Engineering, Developments in Petroleum Science 8, Elsevier Scientific Publishing Company, Amsterdam 1978, pp. 1-43.

Ferdinand et al.: "The determination of source mechanisms of small earthquakes and revised models of local crustal structure by moment tensor inversion," Geophysical Journal International, vol. 151, 2002, pp. 221-234.

Jaeger et al.: "Further problems in elasticity," Fundamentals of Rock Mechanics, third edition, Chapman and Hall, London, 1979, pages pp. 264-283.

Jechumtalova et al.: "Non-double-couple seismic events induced by hydraulic fracturing observed from a linear array of receivers," Paper P031, Proceedings of the 70th EAGE Conference and Exhibition, Rome, Italy, Jun. 9-12, 2008.

Jechumtalova et al.: "Amplitude ratios for complete moment tensor retrieval," Geophysical Research Letters, 32, 2005, L22303.

Jechumtalova et al.: "Point-source parameters from noisy waveforms: error estimate by Monte Carlo simulation," Pure and applied geophysics, 158, 2001, pp. 1639-1654.

Maxwell et al.: "Real-time microseismic mapping of hydraulic fractures in Carthage, Texas," 70th Annual International Meeting, SEG, Expanded Abstracts, 2000, pp. 1449-1452.

Moriya et al.: "Precise source location of AE doublets by spectral matrix analysis of triaxial hodogram," Geophysics, vol. 59, No. 1, 1994, pp. 36-45.

Nolen-Hoeksema et al.: "Moment tensor inversion of microseisms from the B-sand propped hydrofracture, M-site, Colorado", Tectonophysics, 336, 2001, pp. 163-181.

Nolen-Hoeksema et al.: "Moment tensor inversion of microseismic events from hydrofractures," SEG 1999 Expanded Abstracts.

Okada: "Internal deformation due to shear and tensile faults in a half-space," Bulletin of the Seismological Society of America, vol. 82, No. 2, 1992, pp. 1018-1040.

Pearson: "The relationship between microseismicity and high pore pressures during hydraulic stimulation experiments in low permeability granitic rocks," Journal of Geophysical Research, vol. 86, No. B9, 1981, pp. 7855-7864.

Phillips et al.: "Induced microearthquake patterns and oil-producing fracture systems in the Austin chalk," Tectonophysics, vol. 289, 1998, pp. 153-169.

Pinnacle Technologies, Inc: "Cotton Valley fracture imaging project phase III," Final Report for JIP Consortium, Jul. 9, 1999 (Well CGU 22-9, Carthage Field, Cotton Valley Formation, Carthage, Texas, Apr. 1998-May 1999).

Plumb et al.: "The mechanical earth model concept and its application to high-risk well construction projects," IADC/SPE Drilling Conference, New Orleans, Louisiana, Feb. 23-25, 2000, IADC/SPE 59128.

Pollard et al.: "On the mechanical interaction between a fluid-filled fracture and the earth's surface," Tectonophysics, vol. 53, 1979, pp. 27-57.

Richardson: "Completion and stimulation practices in the prolific Cotton Valley Reef trend of east Texas," SPE Annual Technical Conference and Exhibition, New Orleans, Louisiana, Sep. 27-30, 1998, SPE 49049.

Riedesel et al.: "Display and assessment of seismic moment tensors," Bulletin of the Seismological Society of America, vol. 79, No. 1, 1989, pp. 85-100.

Rutledge et al.: "Faulting induced by forced fluid injection and fluid flow forced by faulting: an interpretation of hydraulic-fracture microseismicity, Carthage Cotton Valley Gas Field, Texas," Bulletin of the Seismological Society of America, vol. 94, No. 5, Oct. 2004, pp. 1817-1830.

Rutledge et al.: "Hydraulic stimulation of natural fractures as revealed by induced microearthquakes, Carthage Cotton Valley gas field, east Texas," Geophysics, vol. 68, No. 2, 2003, pp. 441-452.

Settari et al.: "3-D analysis and prediction of microseismicity in fracturing by coupled geomechanical modeling," SPE Gas Technology Symposium, Calgary, Alberta, Apr. 30-May 2, 2002, SPE 75714.

Trifu et al.: "Reliability of seismic moment tensor inversions for induced microseismicity at Kidd Mine, Ontario," Pure and Applied Geophysics, vol. 159, 2002, pp. 145-164.

Vavrycuk: "Inversion for parameters of tensile earthquakes," Journal of Geophysical Research, 106, B8, 2001, pp. 16,339-16,355.

Vavrycuk: "On the retrieval of moment tensors from borehole data," Geophysical Prospecting, vol. 55, 2007, pp. 381-391.

Warpinski et al.: "Analysis and prediction of microseismicity induced by hydraulic fracturing," SPE Journal, Mar. 2004, pp. 24-33 (paper SPE 87673 originally presented at the 2001 SPE Annual Technical Conference and Exhibition, New Orleans, Sep. 30-Oct. 3).

* cited by examiner

METHOD OF SUBSURFACE IMAGING USING MICROSEISMIC DATA

FIELD

Embodiments of the present invention relate to a method of subsurface imaging using microseismic data to determine characteristics of the movement and/or failure of a fracture in a subsurface medium.

BACKGROUND

The field of microseismics involves the monitoring of small scale seismic events which are induced during hydrocarbon operations and result from small movements along faults and fractures. These are caused by changes in pore pressure or the total stress resulting in release of shear stress or tensile opening. The variations in pore pressure may be due to reservoir depletion or hydraulic fracturing operations.

Hydraulic fracturing is used to stimulate wells by pumping a mixture of fluid and proppant (usually sand) into the well to cause a fracture. When the hydraulic pressure is released the fluid may drain away, leaving the sand holding the fracture open and providing a porous medium through which the oil and/or gas can migrate. Thus, the fractures penetrate into the reservoir to allow a wider area to be drained by the well. However, there is a need for determining exactly where a fracture has been generated so as to determine which areas of the reservoir are being exploited and therefore to plan for drilling future wells, and to determine the movement of the fractures and how they will respond to further hydraulic fracturing. Furthermore, the hydraulically induced fractures may intersect natural fractures in the earth, thus providing further conduits for hydrocarbons. Microseismics can be used to monitor the position and movement of hydraulic fractures and any natural fractures close to the hydraulic fractures.

Unlike in seismic surveying, in microseismics the origin time and location of the events is not known. Furthermore, the monitoring of the seismic events is limited. Monitoring is typically carried out by a line of sensors positioned in a nearby well. Therefore, monitoring is limited by the availability and position of nearby wells in which to place sensors. Furthermore, in order to use a well for monitoring, that well must be shut down for production purposes, which results in substantial revenue loss. There are therefore financial constraints on how many wells can be used for monitoring.

The sensors in the wells detect the arrival of P waves and S waves. The timing difference between the P arrivals (first) and the S arrivals (second), together with a knowledge of the velocity profile of the rocks allow calculation of the distance of the seismic event from the sensor. The polarization can be used to deduce a bearing. Ideally, enough measurements would be taken to construct the moment tensor which is a 3×3 matrix tensor which describes how a fault is deforming and which can be represented by a "beach ball diagram." However, there are rarely enough measurements available to fully construct the moment tensor.

The microseismic data is usually sufficient to provide the geometry of the fractures as no directionality is required to locate the position of seismic events. Thus the position and extent of the fractures can usually be determined. However, there is usually not enough information available to construct the full moment tensor (beach ball diagram) and hence determine the deformation on the faults.

SUMMARY

One embodiment of the present invention provides a method of subsurface imaging comprising:

using input data relating to the geometry of a fracture in a subsurface medium, mechanical properties of the medium and in-situ effective stress states in the medium to model the behaviour of the fracture and obtain predicted information relating to the deformation of the fracture; and using the predicted information to constrain the interpretation of measured microseismic data caused by movement of the fracture to determine characteristics of the movement and/or failure of the fracture.

Therefore, starting from the information on the geometry of the cracks, which may be obtained from the microseismic data or from another type of seismic survey, together with mechanical properties of the earth, the cracks can be modelled. The mechanical properties such as pore pressure, failure properties, permeabilities, porosities etc. can be obtained from the cores, geophysical logs etc. A picture of the subsurface geology can be obtained from a seismic survey (which would have been carried out before drilling).

In certain aspects, the modelling the behaviour of the fracture comprises taking into account the effect of an adjacent fracture. The modelling can take into account the effect of one or more fractures which are close enough to interact with each other, and these may be hydrofractures or natural fractures. Preferably, each fracture is modelled as a slot in an elastic material. Preferably, each fracture is modelled as the sum of an empty slot loaded by far field stresses and a slot loaded internally by normal and shear stresses.

In the modelling, the slot may be divided into sections, each section having its own internal normal and shear stresses.

In certain aspects, input data comprises the in-situ total stress, pore pressure of the medium, mechanical formation properties comprising elastic properties (for example in the case of an isotropic medium a Young's Modulus and Poisson's ratio) and failure properties (for example, a friction angle of the fracture).

In certain aspects, the input data relating to the geometry of the fracture is derived from the microseismic data. The steps of determining characteristics of the movement and/or failure of the fracture may comprise deriving a moment tensor for the fracture.

The method may further comprise the obtaining of the microseismic data by providing sensors and recording seismic signals caused by movement of the fracture. Preferably, the sensors are provided in a borehole, on the earth's surface or on the seabed, or any combination of these.

BRIEF DESCRIPTION OF THE DRAWINGS

Embodiments of the present invention will now be described with reference to the accompanying drawings, in which.

DETAILED DESCRIPTION

The first step in the method of the present invention is to determine the geometry of the fault. As can be seen from the data shown in FIGS. 6 and 7, the location of microseismicity can be determined with sufficient accuracy that fault and fracture planes can be discerned. Once the geometry is known, other parameters of the medium such as pore pressure, mechanical properties of the formation (for example, Poisson's ratio) and in situ total stress state can be determined from other types of data, such as well logs.

Figure 1:
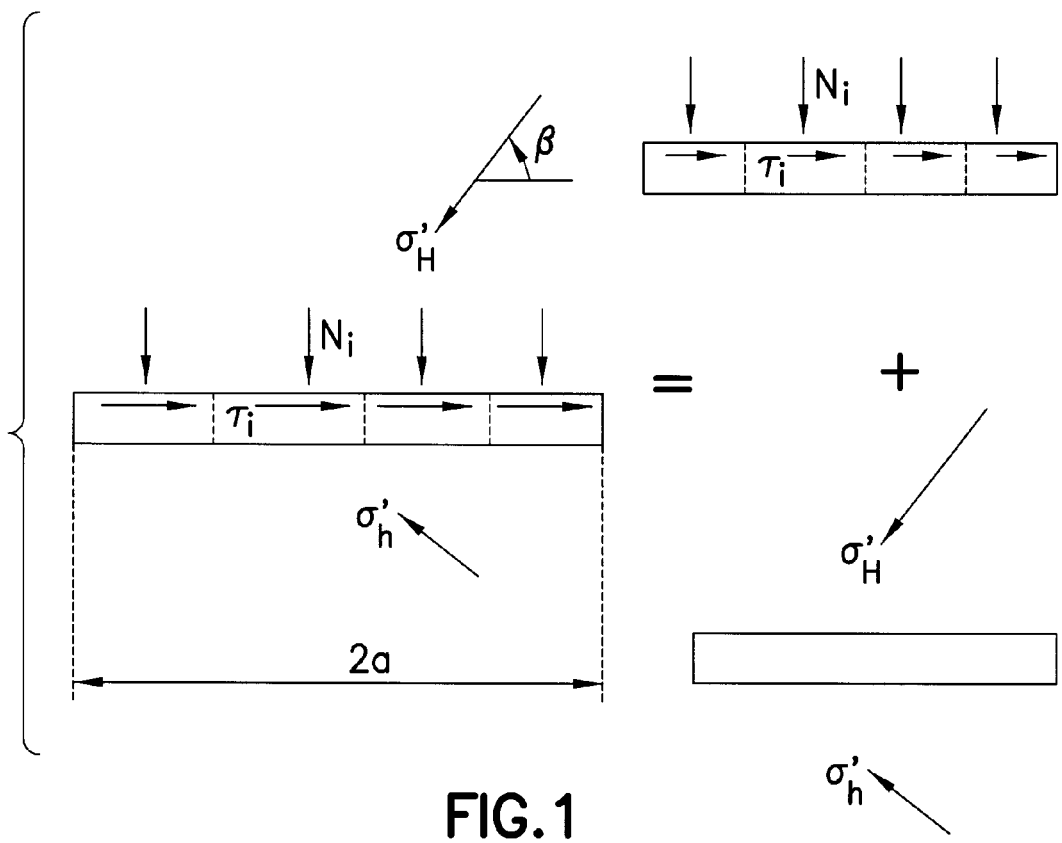
FIG. 1 illustrates the stress state of a slot as the superposition of a slot loaded internally by normal and shear stresses and a slot loaded by far field stresses.

To model the fault, as shown in FIG. 1, each fault is represented as a slot of length $2a$ embedded in an isotropic linear elastic medium. The slot is subjected to internal distributions of effective normal N and shear stresses T, which are related through a frictional law, and far field non-uniform loading comprising perpendicular compressive effective normal stresses of magnitude $\sigma'_H$ and $\sigma'_h$ ordered such that $\sigma'_H \geq \sigma'_h \geq 0$. The effective normal stress $\sigma'_H$ acts along the axis $\theta=\beta$ and $\theta=\pi+\beta$, with $\sigma'_h$ acting along the axes $\theta=\pi/2+\beta$ and $\theta=3\pi/2+\beta$. Deformation is restricted to the plane perpendicular to the fault axis.

The stress state on and around each slot is determined by superposing the solutions for a traction free slot loaded by biaxial stresses at infinity and a slot with distributed normal and shear stresses on its surface with no external loading. Normal and shear stresses on the fault surface are related through a frictional law. The stress state on and around a single crack is derived as follows:

1) if the crack surfaces are in contact it is assumed that the normal stresses on the crack surface are the in-situ normal stresses (at the same location in the absence of the crack), with the shear stresses derived using the frictional law. This approximation will be most accurate for long cracks, where the influence of end effects is negligible along the majority of crack length.

2) if the crack surfaces are not in contact then the crack is assumed to be fluid filled at a known pressure, which determines the normal stress, and the shear stress vanishes.

Figure 2:
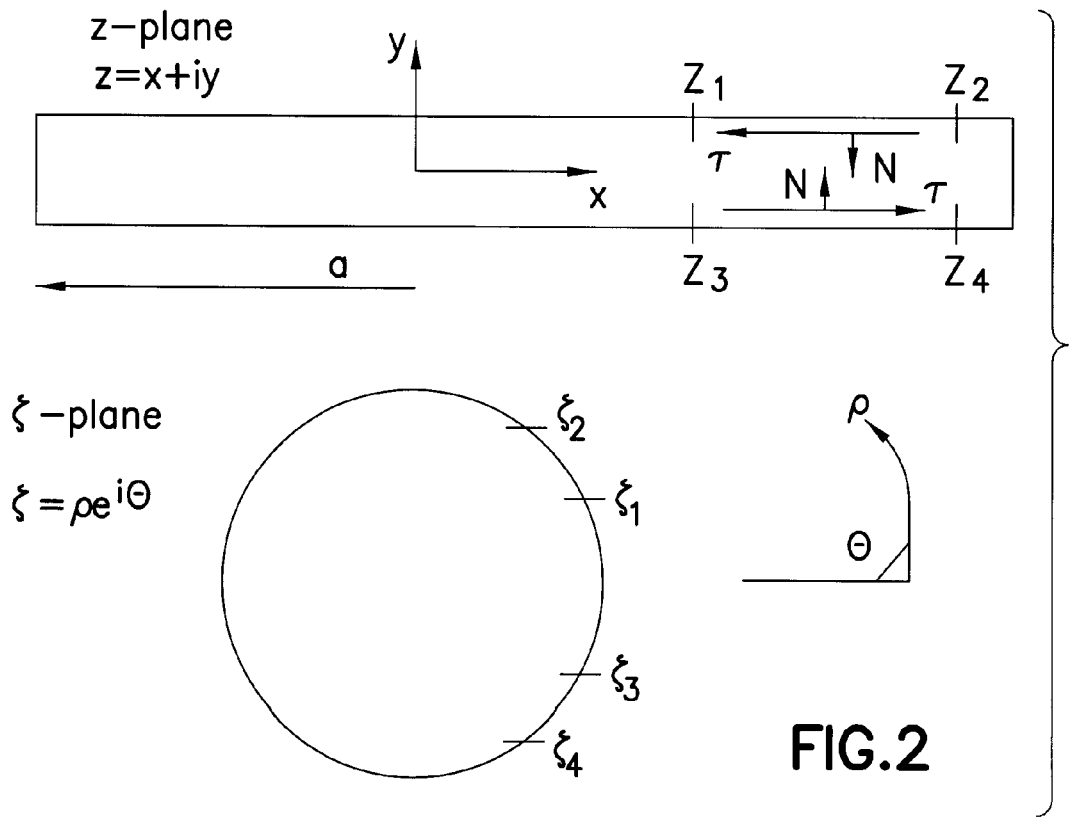
FIG. 2 illustrates a solution found by dividing the slot into segments.

FIG. 2 illustrates a solution disclosed by Pollard, D. D. and Holzhausen, G. (1979) ("On the mechanical interaction between a fluid filled crack and the earth's surface," Tectnophysics 53, 27-57). Uniform effective normal and shear stresses, N and $\tau$ respectively, act on a segment of the slot located between $z_1$ and $z_2$ and also between $z_3$ and $z_4$. The solution for the case where the slot is loaded along its entire length is found by summing the solutions from each segment.

It is convenient to work in the $\zeta$-plane, where the points correspond to $z_i$ for i=1, 2, 3, 4. In general z and $\zeta$ are related through the Jowkowsky transformation:

$$z = w(\zeta) = \frac{1}{2}a(\zeta + \zeta^{-1}), \quad (2.1)$$

$$|\zeta| \geq 1,$$

$$\zeta = \frac{1}{a}\left[z \pm \sqrt{z^2 - a^2}\right]$$

In the latter equation, the positive root should be adopted for $\text{Im}(z) \geq 0$, and the negative root for $\text{Im}(z) < 0$.

The stress distribution is given by:

$$\sigma_{xx} + \sigma_{yy} = 4\text{R}\left[\frac{\phi'(\zeta)}{w'(\zeta)}\right], \quad (2.2)$$

$$\sigma_{xx} + \sigma_{yy} + 2i\sigma_{xy} = 2\left[\overline{w(\zeta)}\left\{\frac{w'(\zeta)\phi''(\zeta) - w''(\zeta)\phi'(\zeta)}{(w'(\zeta))^3}\right\} + \frac{\psi'(\zeta)}{w'(\zeta)}\right].$$

The stress functions $\phi(\zeta)$ and $\psi(\zeta)$ are $$\phi(\zeta) = \frac{(N - iT)a}{4i\pi}\{t_1 + t_2 - t_3\}, \quad (2.3)$$

$$\psi(\zeta) = \frac{Na}{4i\pi}\{t_4 - t_5 - t_6 + t_7\} - \frac{Ta}{4\pi}\{t_8 - t_9 - t_{10} + t_{11}\},$$

where:

$$t_1 = 2\zeta^{-1}\ln\left(\frac{\zeta_2}{\zeta_1}\right), \quad (2.4)$$

$$t_2 = (\zeta + \zeta^{-1} - \zeta_1 - \zeta_1^{-1})\ln\left(\frac{\zeta_1 - \zeta}{\zeta_1^{-1} - \zeta}\right),$$

$$t_3 = (\zeta + \zeta^{-1} - \zeta_2 - \zeta_2^{-1})\ln\left(\frac{\zeta_2 - \zeta}{\zeta_2^{-1} - \zeta}\right),$$

$$t_4 = \frac{4\zeta}{\zeta^2 - 1}\ln\left(\frac{\zeta_2}{\zeta_1}\right),$$

$$t_5 = (\zeta_1 - \zeta_1^{-1} - \zeta_2 + \zeta_2^{-1})\left(\frac{1 + \zeta^2}{\zeta^2 - 1}\right),$$

$$t_6 = (\zeta_1 + \zeta_1^{-1})\ln\left(\frac{\zeta_1 - \zeta}{\zeta_1^{-1} - \zeta}\right),$$

$$t_7 = (\zeta_2 + \zeta_2^{-1})\ln\left(\frac{\zeta_2 - \zeta}{\zeta_2^{-1} - \zeta}\right),$$

$$t_8 = \frac{4\zeta^{-1}}{\zeta^2 - 1}\ln\left(\frac{\zeta_2}{\zeta_1}\right),$$

$$t_9 = (\zeta_1 - \zeta_1^{-1} - \zeta_2 + \zeta_2^{-1})\left(\frac{1 + \zeta^2}{\zeta^2 - 1}\right),$$

$$t_{10} = \{2(\zeta + \zeta^{-1}) - \zeta_1 - \zeta_1^{-1}\}\ln\left(\frac{\zeta_1 - \zeta}{\zeta_1^{-1} - \zeta}\right),$$

$$t_{11} = \{2(\zeta + \zeta^{-1}) - \zeta_2 - \zeta_2^{-1}\}\ln\left(\frac{\zeta_2 - \zeta}{\zeta_2^{-1} - \zeta}\right).$$

The first and second derivatives of $\phi$ and $\psi$ are easily derived using (2.3) and (2.4).

Figure 3:
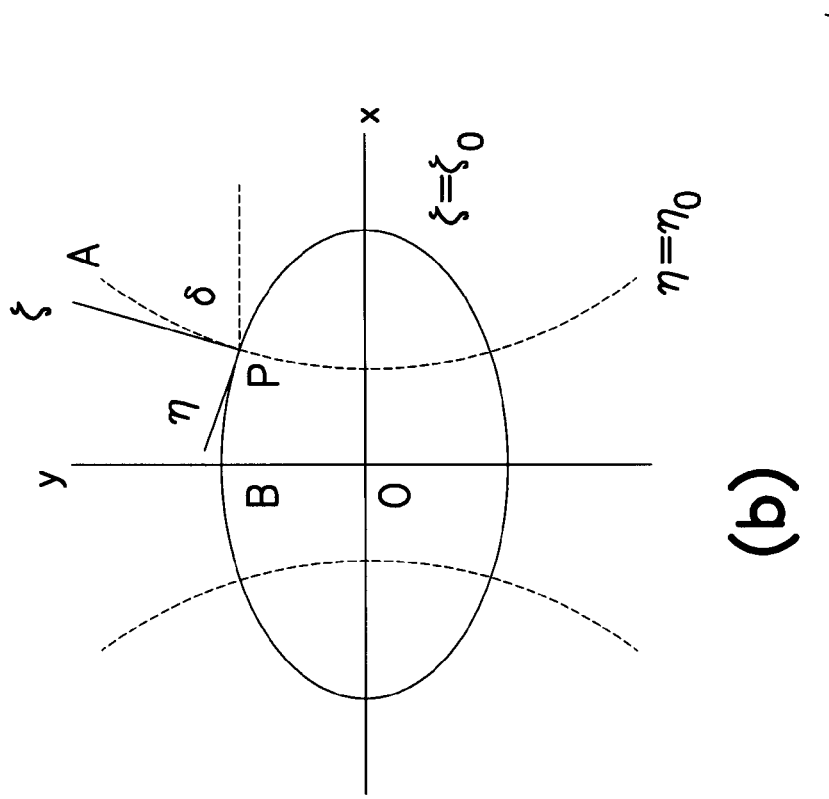
FIG. 3 shows an elliptical crack with Cartesian and elliptical coordinate systems.
Figure 3:
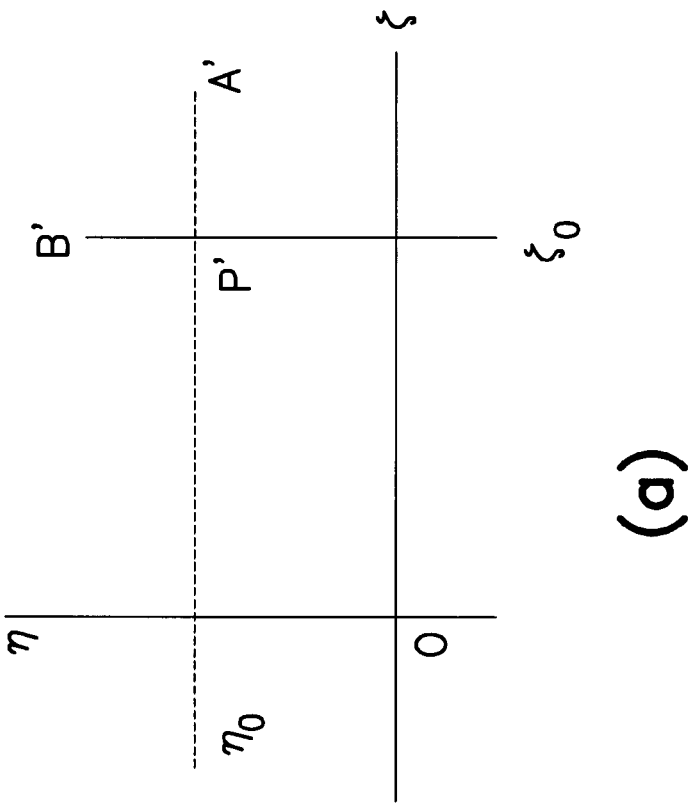

The solution for a traction free slit loaded by far field biaxial stresses is given by J. C. Jaeger and N. G. W. Cook, *Fundamentals of Rock Mechanics*, 3rd Edition, Chapman and Hall, London) (1979). FIG. 3 shows an elliptical crack with Cartesian (x,y) and elliptic coordinate systems. These are related through $$z = \alpha \cos h\zeta \quad (2.5)$$

where $z = x + iy$ and $\zeta + \xi i\eta$. Expanding gives $x = \alpha \cos h\zeta \cos \eta$ $y = \alpha \sin h\zeta \sin \eta \quad (2.6)$ The surface of the elliptic hole is defined by $\zeta = \zeta_0$, so the length of the major and minor semi-axes are $\alpha \cos h \zeta_0$ and $\alpha \sin h \zeta_0$, respectively. The ellipse becomes a slit from $|x| \leq a$ when $\zeta_0 = 0$. The stresses at the slit wall, in $\zeta$ coordinates, then are $$\sigma_\xi + \sigma_\eta = 2[\phi'(z) + \overline{\phi'(z)}], \quad (2.7)$$

$$\sigma_\eta - \sigma_\xi + 2i\sigma_{\eta\xi} = 2[\bar{z}\phi''(z) + \psi(z)]\frac{w'(\zeta)}{\overline{w'(\zeta)}},$$

where $w(\zeta) = \alpha \cosh \zeta$ and $$\phi(z) = \frac{a}{4}\sigma'_H[\cos 2\beta \cosh\zeta + (1 - e^{2i\beta})\sinh\zeta] + \ldots \quad (2.8)$$

$$\frac{a}{4}\sigma'_h[\cos 2(\beta + \pi/2)\cosh\zeta + (1 - e^{2i(\beta+\pi/2)})\sinh\zeta],$$

$$\psi(z) = -\frac{a}{4}\sigma'_H[1 - \cos 2\beta + \sinh 2(\zeta - i\beta)]\csc\zeta + \ldots - \quad (2.9)$$

$$\frac{a}{4}\sigma'_h[1 - \cos 2(\beta + \pi/2) + \sinh 2(\zeta - i(\beta + \pi/2))]\csc\zeta.$$

Fault Interaction

Each fracture perturbs the stress state in its own vicinity. When the fractures are sufficiently far apart then the perturbed zones do not overlap and the fractures behave independently. When the perturbed zones do overlap, then the behaviour of the fractures is coupled. In particular the normal stress at any point on one fault depends on the normal and shear stresses on all other coupled faults and the far-field stress state. Similarly, the shear stress at any point on one fault is related to the normal stress at the same point through a constitutive law (e.g., friction) and also depends on the normal and shear stresses on all other coupled faults and the far-field stress state. It is possible to use superposition to construct a linear system of equations to determine the stress state on the fractures of the form $A\sigma=B$. Here $\sigma$ is the vector of effective normal and shear stresses acting on the cracks (which are segmented into many elements) and B comprises the in-situ effective stress state plus the effect that each empty slot loaded by far field stresses has on every other slot. The coefficients of matrix A define the effect that the effective shear and normal stresses on one crack have on all other cracks and the relationship between the effective normal and shear stresses within each crack. This method is applicable to a system comprised of any number of cracks.

Figure 4:
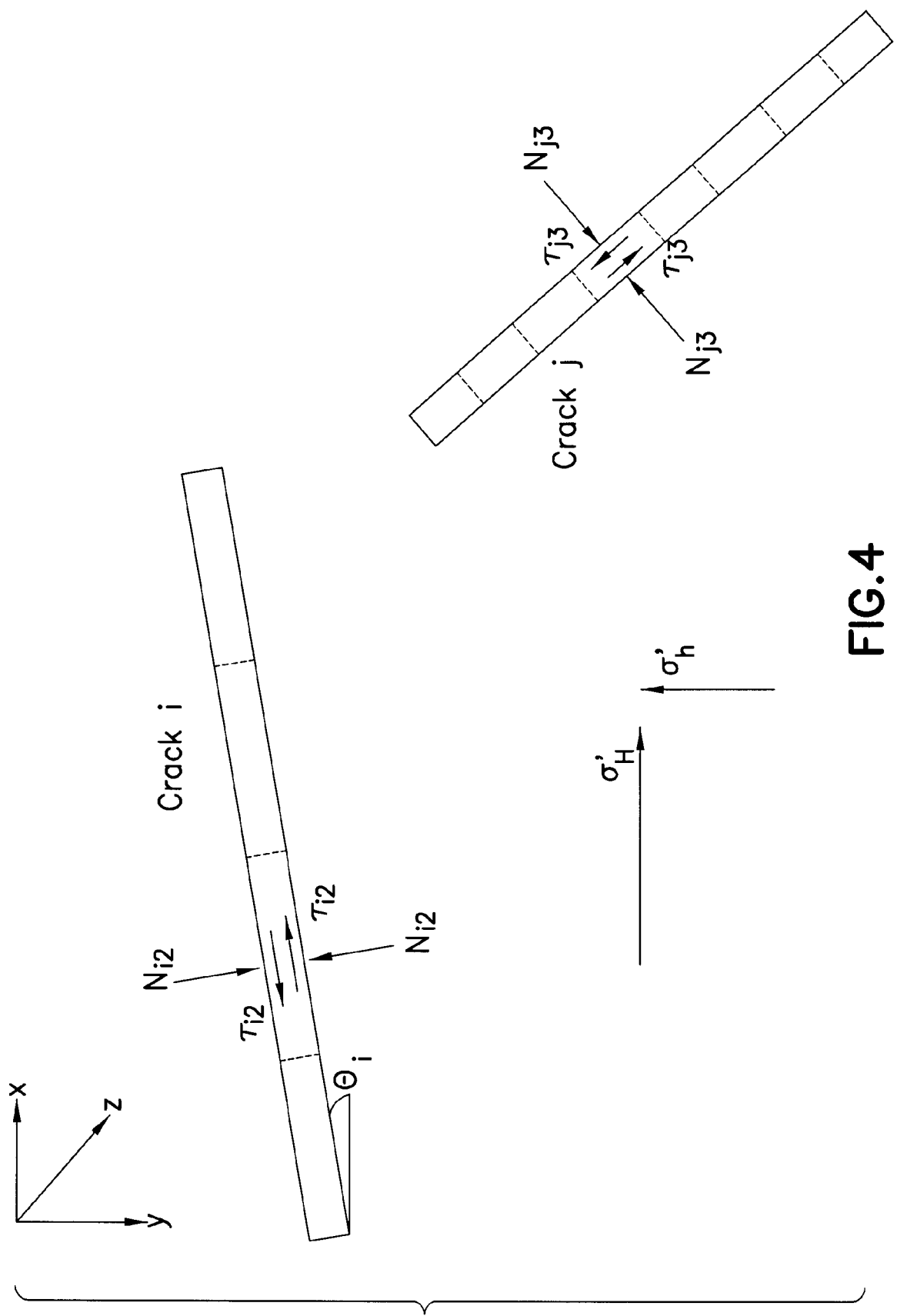
FIG. 4 illustrates two interacting cracks.

FIG. 4 shows an example where there are two slots. Each slot is split into a plurality of segments, to allow for non-uniform loading. Let $N_{ij}$ and $\tau_{ij}$ denote the unknown effective normal and shear stresses acting in the jth element of the ith crack. Further, let $n^n_{ijkl}$ and $n^\tau_{ijkl}$ denote the effective normal and shear stresses on the $j^{th}$ element of the $i^{th}$ crack generated by a normal stress of unit magnitude acting on the $l^{th}$ element of the $k^{th}$ crack. Similarly, $s^n_{ijkl}$ and $s^\tau_{ijkl}$ denote the effective normal and shear stresses on the $j^{th}$ element of the $i^{th}$ crack generated by an effective shear stress of unit magnitude acting on the $l^{th}$ element of the $k^{th}$ crack. It is physically reasonable to assume, for the representation depicted in FIG. 1, that the effective normal stress on a segment is the sum of the in-situ effective normal stress (at the location of the segment in the absence of the crack) and the effective normal stresses created by the presence of other cracks. This assumption is valid provided (i) crack surfaces remain in contact, (ii) each crack senses the others through stress fields and not via any kinematic interaction, and (iii) the density of cracks is not so large that local effects overwhelm the regional stresses.

The problem has been formulated to avoid using a successive approximations method such as the Schwartz-Neumann alternating technique. These techniques for problems where all the boundary conditions are prescribed, i.e., in cases where the crack surfaces are not in contact and there is internal pressurization by a known pore pressure. Here, successive elastic solutions are superposed until the boundary conditions are satisfied. As the number of elastic solutions that is deployed increases, the contribution of the last solution becomes ever smaller, to the point where adding further solutions has no material influence on the global result.

Hence, the effective normal $N_{ij}$ and shear stresses $\tau_{ij}$ on the $j^{th}$ element of the $i^{th}$ crack can be written as:

$$N_{ij} = N^c_{ij} + M_{i'i''}M_{j'j''}\sum_k\sum_l N_{kl}n^n_{ijkl} + \quad (2.10)$$

$$f_{ij}M_{i'i''}M_{j'j''}\sum_k\sum_l \tau_{kl}s^n_{ijkl} + L_{i'i'''}L_{j'j'''}\sigma_{ij},$$

$$\tau_{ij} = f_{ij}\tau^c_{ij} + M_{i'i''}M_{j'j''}\sum_k\sum_l N_{kl}n^\tau_{ijkl} +$$

$$f_{ij}M_{i'i''}M_{j'j''}\sum_k\sum_l \tau_{kl}s^\tau_{ijkl} + L_{i'i'''}L_{j'j'''}\sigma_{ij}.$$

Here $N^c_{ij}$ and $f_{ij}\tau^c_{ij}$ denote the effective and normal stresses on segment j of crack i created by effects such as internal friction and shear displacements somewhere in the crack system; $f_{ij}$ defines the direction in which the shear stresses act, $\sigma_{ij}$ is the effective in-situ stress acting at the location of the $j^{th}$ segment of the $i^{th}$ crack. Note that the stress components in all of the above terms are referenced in the crack i coordinate system. Hence if i' and j' are unit vectors in the x and y coordinate system for crack i with (i", j") and (i''', j''') being the corresponding quantities for crack k and the in-situ stress directions, then for the case shown in FIG. 4:

$$M = \begin{pmatrix} \cos(\theta_i + \theta_j) & \sin(\theta_i + \theta_j) \\ -\sin(\theta_i + \beta_j) & \cos(\theta_i + \theta_j) \end{pmatrix} \quad (2.11)$$

$$L = \begin{pmatrix} \cos\theta_i & -\sin\theta_i \\ \sin\theta_i & \cos\theta_i \end{pmatrix}$$

No Slippage in the Fault System

If there is no shear or tensile displacements and a frictional interaction then $\tau^c_{ij} = f_{ij}\mu N_{ij}$ and $N^c_{ij} = 0$. The frictional coefficient, $\mu$, is given by $\mu = \sqrt{\{(1+\sin\phi)/(1-\sin\phi)\}}$, where $\phi$ is the friction angle.

The system of equations 2.10 for the case depicted in FIG. 4 can then be written as:

$$\begin{pmatrix} a_1 & a_2 & a_3 & a_4 \\ a_5 & a_6 & a_7 & a_8 \\ a_9 & a_{10} & a_{11} & a_{12} \\ a_{13} & a_{14} & a_{15} & a_{16} \end{pmatrix}\begin{pmatrix} N_1 \\ N_2 \\ \tau_1 \\ \tau_2 \end{pmatrix} = \begin{pmatrix} N_1^{in-situ} \\ N_2^{in-situ} \\ \tau_1^{in-situ} \\ \tau_2^{in-situ} \end{pmatrix}. \quad (2.12)$$

Let crack i be discretized into $n_i$ elements (i=1, 2). Then the matrices $a_i$ (i=1, 2, ..., 16) are readily derived and are given below in Tables 1 and 2. Clearly this formulation can be readily extended to cases where there are more than two interacting cracks.

TABLE 1

Components of the governing system of equations.

| Matrix | Size | Form |
|---|---|---|
| $a_1$ | $n_1 \times n_1$ | I |
| $a_3$ | $n_1 \times n_1$ | 0 |
| $a_6$ | $n_2 \times n_2$ | I |
| $a_8$ | $n_2 \times n_2$ | 0 |
| $a_9$ | $n_1 \times n_1$ | $-\mu$If |
| $a_{11}$ | $n_2 \times n_2$ | I |
| $a_{14}$ | $n_1 \times n_1$ | $-\mu$If |
| $a_{16}$ | $n_2 \times n_2$ | I |

TABLE 2

Components of the governing system of equations.

| Matrix | Elements |
|---|---|
| $a_2$ | $\begin{pmatrix} -n^n_{1121} & -n^n_{1122} & \cdots & -n^n_{112n_2} \\ & \vdots & & \\ -n^n_{1n_121} & & & \end{pmatrix}$ |
| $a_4$ | $\begin{pmatrix} -\tau^n_{1121} & -\tau^n_{1122} & \cdots & -\tau^n_{112n_2} \\ & \vdots & & \\ -\tau^n_{1n_121} & & & \end{pmatrix}$ |
| $a_5$ | $\begin{pmatrix} -n^n_{2111} & -n^n_{2112} & \cdots & -n^n_{211n_1} \\ & \vdots & & \\ -n^n_{2n_211} & & & \end{pmatrix}$ |
| $a_7$ | $\begin{pmatrix} -\tau^n_{2111} & -\tau^n_{2112} & \cdots & -\tau^n_{211n_1} \\ & \vdots & & \\ -n^n_{2n_211} & & & \end{pmatrix}$ |
| $a_{10}$ | $\begin{pmatrix} -n^\tau_{1121} & -n^\tau_{1122} & \cdots & -n^\tau_{112n_2} \\ & \vdots & & \\ -n^\tau_{1n_121} & & & \end{pmatrix}$ |
| $a_{12}$ | $\begin{pmatrix} -\tau^\tau_{1121} & -\tau^\tau_{1122} & \cdots & -\tau^\tau_{112n_2} \\ & \vdots & & \\ -\tau^\tau_{1n_121} & & & \end{pmatrix}$ |
| $a_{13}$ | $\begin{pmatrix} -n^\tau_{2111} & -n^\tau_{2112} & \cdots & -n^\tau_{211n_1} \\ & \vdots & & \\ -n^\tau_{2n_211} & & & \end{pmatrix}$ |
| $a_{15}$ | $\begin{pmatrix} -\tau^\tau_{2111} & -\tau^\tau_{2112} & \cdots & -\tau^\tau_{211n_1} \\ & \vdots & & \\ -\tau^\tau_{2n_211} & & & \end{pmatrix}$ |

The solution of the governing system (2.10) gives the stress distribution along the cracks. The stress state at a point not located on a crack can then be computed by applying the solutions of Pollard and Holzhausen (1979) together with Jaeger and Cook (1979) to every crack, and then summing the results.

Slippage Somewhere in the Fault System

A pre-existing fault does not normally slip simultaneously along its entire length. Usually, only part of a fault slips at any instant. Stress is transferred to other segments which then may or may not slip, depending on their cohesive and frictional properties and the magnitude of the stress transfer.

During shear slippage, rough surfaces slide relative to one another. Initially, due to the presence of surface asperities, "shear dilation" is causes the fracture aperture to widen. As the further slippage occurs, or as the magnitude of the stress normal to the fault increases, then the fault surfaces become smoother as asperities are reduced and eventually eliminated. The presence, type of mineral deposition (e.g., crystalline, clay) and the pore pressure will influence the fault behaviour.

It is assumed, for simplicity, that the frictional coefficient depends on the shear displacement.

The stress drop due to shear slippage assumed to be of the form.

$$\Delta \tau_{ij} = (\mu - \mu_{slip}) N_{ij}, \quad (3.13)$$

where $\mu_{slip}$ denotes the post slip friction coefficient. Clearly the shear stress before and after slippage are $\mu N_{ij}$ and $\mu_{slip} N_{ij}$, respectively. The post slip friction coefficient can be related to the shear displacement, d, by $$\mu_{slip} = \mu_{final} + (\mu_{initial} - \mu_{final}) \exp^{-ld}. \quad (3.14)$$

Figure 5:
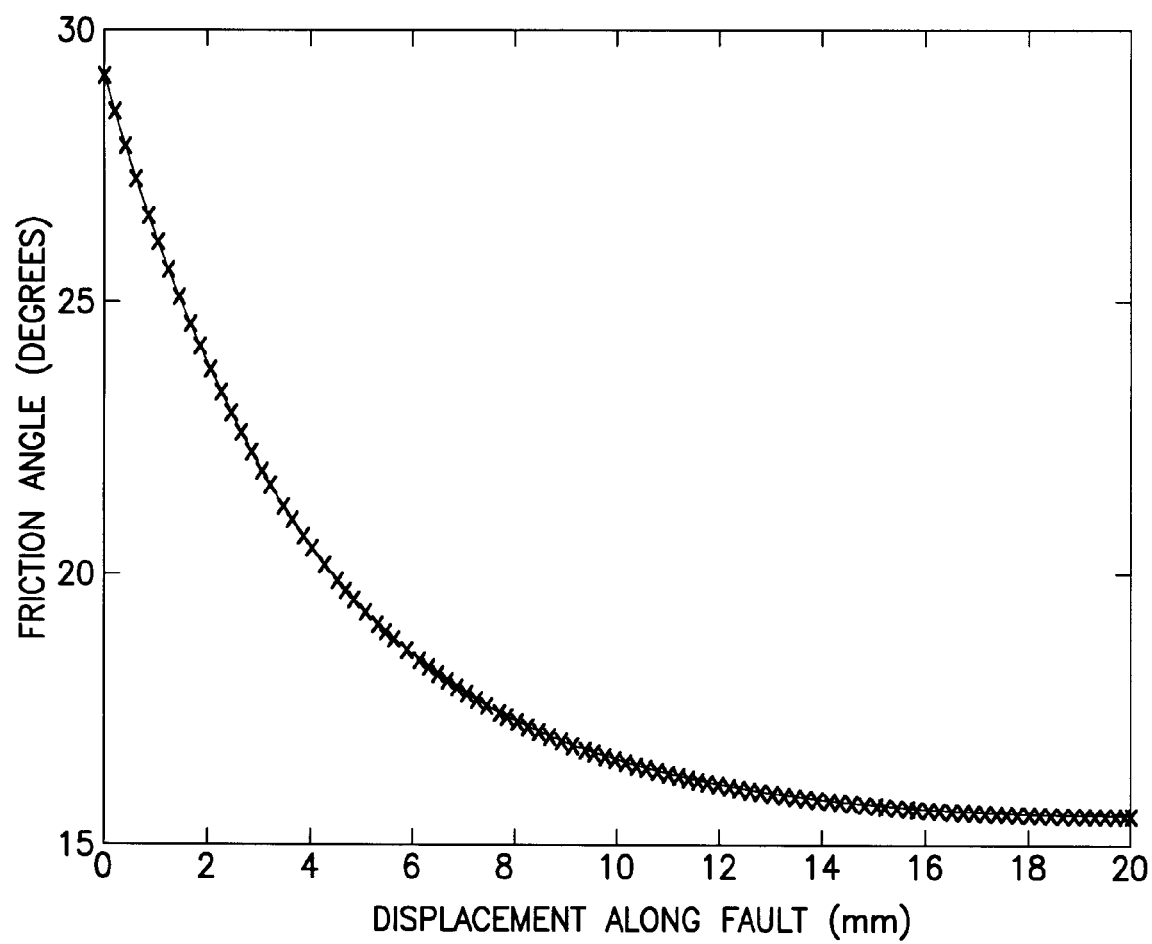
FIG. 5 shows the relationship between friction angle and shear displacement.

Here $\mu_{slip}$, $\mu_{final}$ and $\mu_{initial}$ are the current, limiting and initial values of the friction coefficient, respectively, with d denoting the total shear displacement and l is a constant. FIG. 5 illustrates this relationship.

Equations (3.13) and (3.14) imply that the behaviour of a system of pre-existing natural fractures can be fully determined if all slippage is detectable and can be quantified. This is never the case: aseismic slip occurs due to creep; additionally events may simply not be detectable. It is also known that aseismic slip can be the predominant component of total displacements. Hence aseismic/non-detectable slip will have to be inferred from the characteristics of the detected events.

The governing equations at each stage, from (2.11), are $$N^c_{ij} = \begin{cases} N^{slip}_{ij}, & \text{Non-slipping segment,} \\ 0, & \text{Slipped segment,} \end{cases} \quad (3.15)$$

$$\tau^c_{ij} = \begin{cases} \tau^{slip}_{ij} + \mu N_{ij}, & \text{Non-slipping segment,} \\ -f_{ij}(\mu - \mu_{slip}) N_{ij}, & \text{Slipped segment.} \end{cases}$$

wherein $N_{ij}^{slip}$ and $\tau_{ij}^{slip}$ are derived as disclosed in Okada, Y. (1992), "Internal deformation due to shear and tensile faults in a half-space." [Bulletin of the Seismological Society of America 82(2), 1018-1040]. This paper is important in earthquake studies; many workers in the field have coded the solution and have made their efforts publicly available. The present invention uses a convenient Matlab implementation developed by Cai et al. [Cai, M. J., Wu, Z. L. and Wan, Y. G. (2004) "A Matlab implementation of internal deformation field for static stress triggering calculation;" Earthquake Hazard, risk and strong ground motion, IUGG Special Edition, 191-203]. Thus the governing equations in the case of slip are a slightly modified form of (2.12):

$$\begin{pmatrix} a_1 & a_2 & a_3 & a_4 \\ a_5 & a_6 & a_7 & a_8 \\ a_9 & a_{10} & a_{11} & a_{12} \\ a_{13} & a_{14} & a_{15} & a_{16} \end{pmatrix} \begin{pmatrix} N_1 \\ N_2 \\ \tau_1 \\ \tau_2 \end{pmatrix} = \begin{pmatrix} N_1^{in\text{-}situ} + N_1^{slip} \\ N_2^{in\text{-}situ} + N_2^{slip} \\ \tau_1^{in\text{-}situ} + \tau_1^{slip} \\ \tau_2^{in\text{-}situ} + \tau_2^{slip} \end{pmatrix}. \quad (3.16)$$

The elements of $N_i^{slip}$ and $\tau_i^{slip}$ (i=1, 2) are the slip induced components of $N^c_{ij}$ and $\tau^c_{ij}$ in (3.15). The elements of $a_i$ are also slightly amended: on slipped segments $\mu$ is replaced by $\mu_{slip}$. Thus in cases where there is slippage the additional computational elements are (i) the use of Okada's algorithm to compute the change in stress state along cracks, and (ii) additional book-keeping to track which segments have slipped.

EXAMPLE

Figure 6:
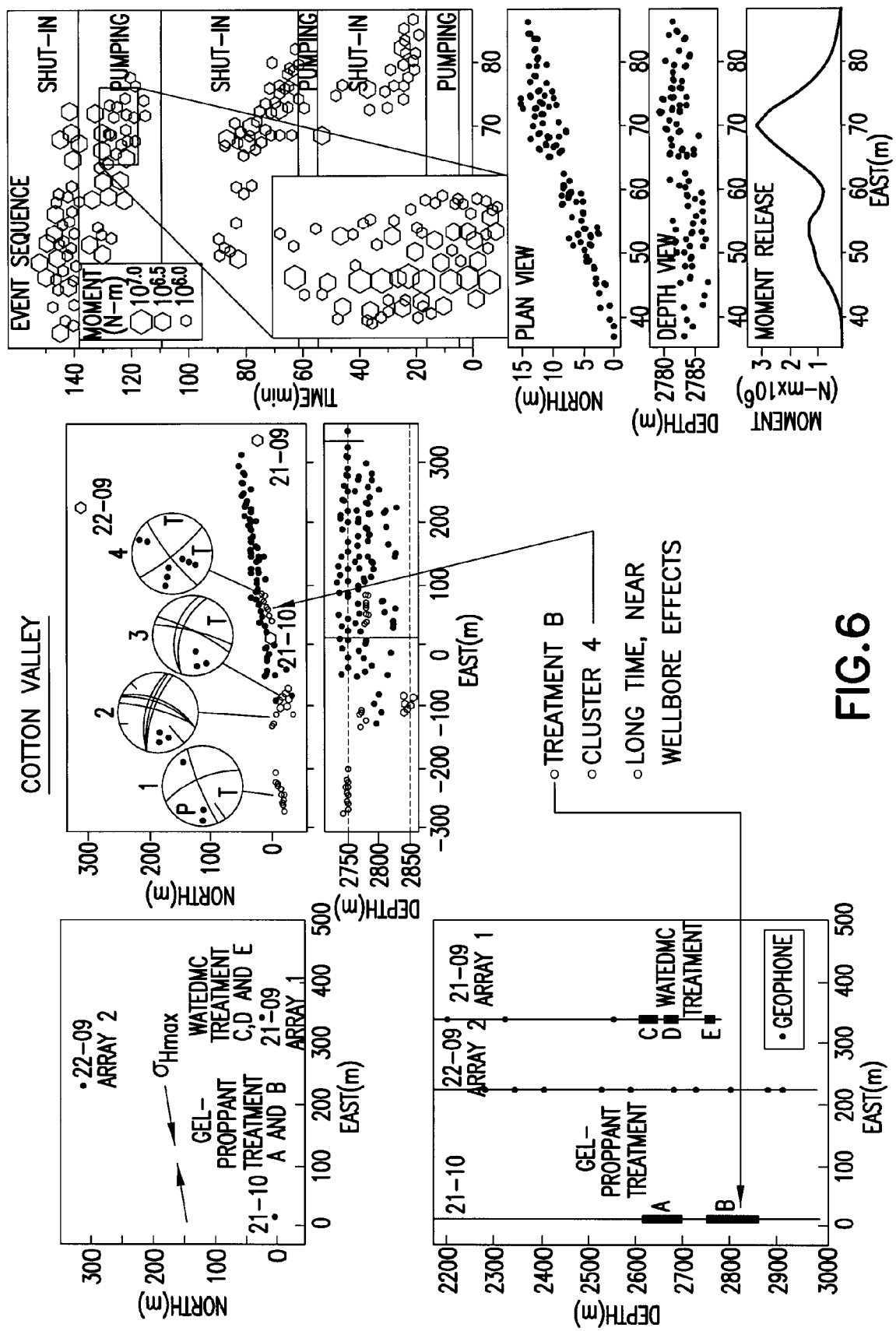
FIG. 6 shows microseismicity generated during and after hydrofracturing in Cotton Valley.

FIG. 6 shows the microseismicity generated during and after hydraulic fracturing in Cotton Valley, Tex. This example considers treatment B in well 21-10 (see the left hand plot in FIG. 6). There are two monitoring wells, labelled 21-09 and 22-09, both of which are approximately 1200 ft from well 21-10.

The main hydrofracture is shown in the middle plot of FIG. 6. As expected, the fracture is parallel to the maximum principal stress direction. However the fracture is very asymmetric. Part of this asymmetry is due to the left hand fracture wing being furthest from the monitoring wells, which inevitable leads to detectability issues. The most interesting aspect of this stimulation, however, is the behaviour of cluster 4, which is comprised of a set of natural fractures (see the annotations on FIG. 6). It can be seen on the right hand plot that during three pumping and shut in cycles, microseismicity in this cluster begins far away from well 21-10 and migrates towards the well over time. Moreover the magnitude of the events, as denoted by the size of the hexagons, increases over time. Previously, Bradford (UK Patent Application GB2439571, U.S. Patent Application 20080004847) showed that the microseismicity pattern for cluster 4 can be qualitatively predicted by simply integrating geological and engineering data in order to determine the stresses acting on the natural fractures. This analysis, however, is not sophisticated enough for quantitative predictions (e.g., for the decay in microseismicity during each shut-in interval) because it does not account for the effect of slip between segments on the same fault. The present invention corrects for this effect.

The stress state has been computed for the crack system shown in FIG. 7 over one pumping and shut-in cycle using the parameter set given below (the behaviour of the system can be observed over one pumping and shut-in cycle: two further cycles merely accentuate any effects). The results are summarized in FIG. 8.

TABLE 3

Mechanical and geometrical parameters.

| Parameter | Value |
|---|---|
| E (MPsi) | 5.2365 |
| ν | 0.244 |
| φ (deg) | 27.5 |
| μ | 0.573 |
| $\mu_{slip}$ | 0.4 |
| $\sigma_H$ (Psi) | 5635 |
| $\sigma_h$ (Psi) | 5122 |
| $\sigma_v$ (Psi) | 6692 |
| $P_p$ (Psi) | 3465 |
| $\theta_1$ (deg) | 17.77 |
| $\theta_2$ (deg) | −5.3 |
| Half length of crack 1 (ft) | 44.68 |
| Half length of crack 2 (ft) | 28.05 |

Figure 8A:
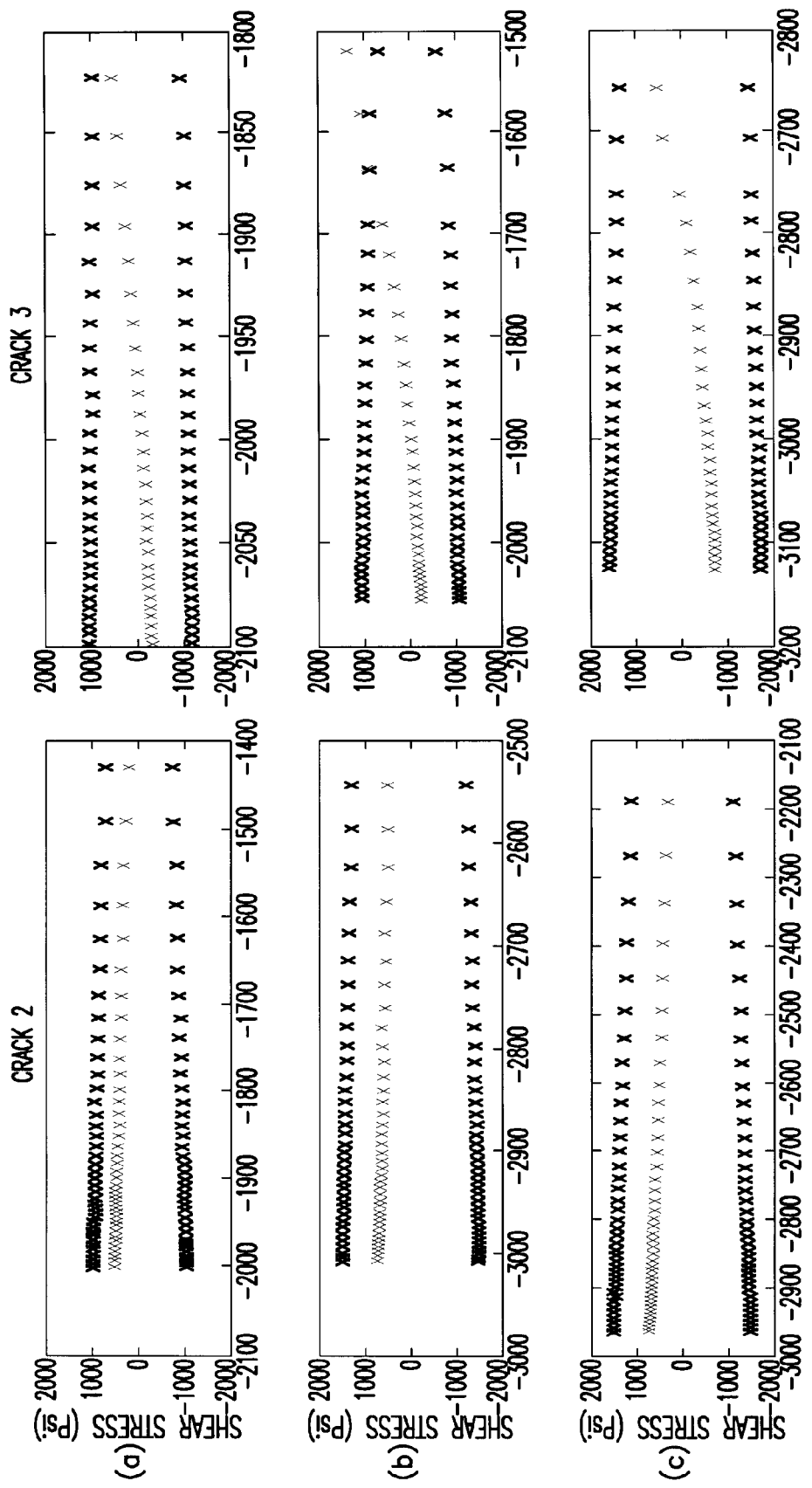
FIG. 8 shows a summary of the results of the modelling.
Figures 8, 8A, 8B:
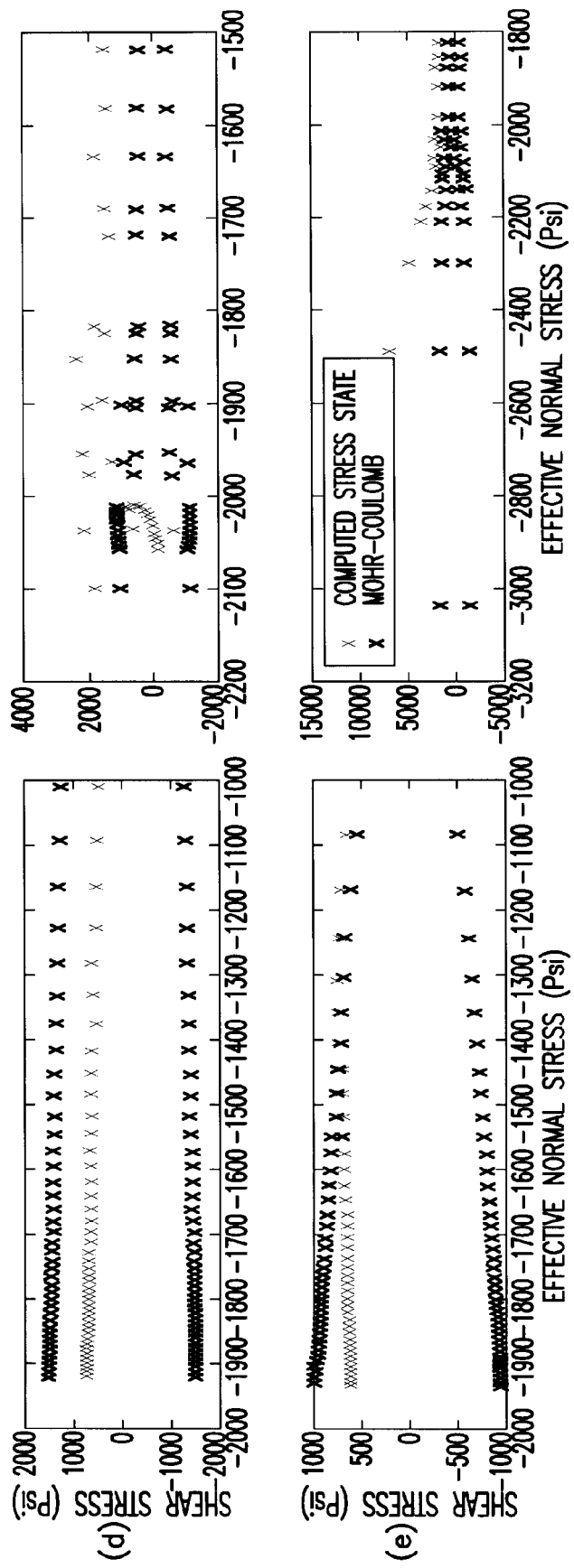

In FIG. 8, row (a) shows the stress state along the cracks under in-situ conditions. Neither crack is failing. However, crack three is more likely to fail than crack two, at its left hand end.

Row (b) shows the stress state during early part of the pumping interval where the right hand end of the hydraulic fracture is between the left hand end of crack two and the left hand end of crack three. Right lateral shear slip is induced at the left hand end of crack three. This is aseismic deformation: it was not detected by geophones in the monitoring wells. Moreover, it is important to note:

1) Without this slippage during the pumping interval, it would not be possible to explain the behaviour of the natural fracture system over a pumping and shut-in cycle. This demonstrates the importance of using modelling to predict aseismic slip, in conjunction with microseismic monitoring to detect seismic slip.

2) The stress transfer due to slippage on one segment is sufficient to cause failure on neighbouring segments. By iteration, this may cause failure along significant proportions of faults (i.e., a domino effect).

Crack two remains stable.

Row (c) shows the stress state during the later part of the pumping interval where the right hand end of the hydraulic fracture is to the left of the right of crack three. The increase in the normal stress acting along the entire length of crack three prevents further shear slippage (effectively crack three is clamped by the additional confining pressure). Crack two again remains stable.

Figure 7:
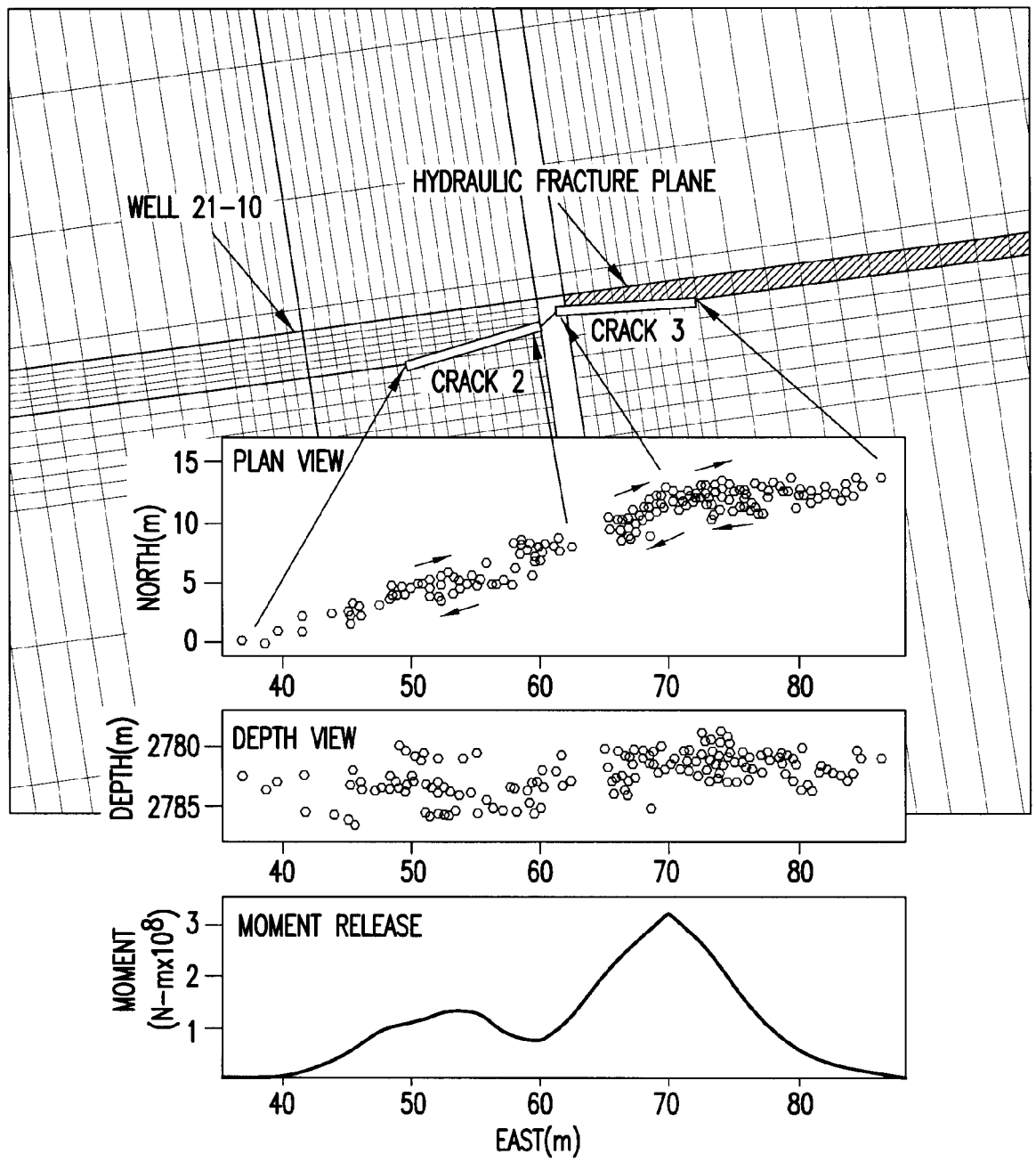
FIG. 7 shows the geometry of a crack system.

Row (d) shows the stress state during the early part of the shut-in interval where the right hand end of the hydraulic fracture is to left of the right of crack three and is extending towards the left side of FIG. 7, albeit ever more slowly, while the fracture tip fluid pressure continues to exceed the propagation pressure. The sudden reduction in normal stress acting on crack three causes significant slippage: it is necessary to increase the slippage on each segment to 1 cm per segment (a typical segment is 67 cm in length) to match microseismic activity observed from crack two in the latter part of the shut-in period (see row (e) comments below). The physical reasons for the increased microseismic magnitude are (i) dynamic effects caused by the sudden reduction in pressure and (ii) the reduced friction coefficient on the slipped segments, which causes the shear stress drop to be larger than would otherwise be the case.

In this early part of the shut-in interval, however, crack two again remains stable.

Row (e) shows the stress state during the latter part of the shut-in interval where the hydraulic fracture is no longer propagating and the pressure is significantly less than that required for propagation. Here the slippage on each segment of crack three has been increased to 7 cm per segment: this is sufficient to induce failure along a significant portion of crack two, beginning from its right hand end. This matches the observations of Rutledge et al. ["Faulting induced by forced fluid injection and fluid flow forced by faulting: an interpretation of hydraulic fracture microseismicity", Carthage Cotton Valley Gas field, Texas; Bulletin of the Seismological Society of America, 94(5), 1817-1830].

In rows (d) and (e), it should be noted that the stress state on crack three is strictly in an inadmissible region (i.e., outside of the Mohr-Coulomb envelope). This is because the description of a partly slipping fault that has been adopted here requires modification. This description has been taken directly from earthquake mechanics and clearly further work is required to clarify the mechanics appropriate to natural fractures in hydrocarbon reservoirs. Similarly, it is also necessary to reliably link stress drop and deformation (a straightforward relation exists for circular sources), although elementary history matching dictated the use of 1 cm and 7 cm shear slippage to compute the results on row (d) and (e), respectively.

Finally, it is interesting to note the following from rows (b) and (c). When pumping first started, a "domino" failure effect began on crack three. This failure was suppressed when the hydrofracture growth caused this crack to be clamped under increased confining pressure. This shows that, in certain environments, it may be beneficial to pump slowly to allow the "domino effect" to take place and if this effect occurs, there may be a beneficial increase in the conductivity of natural fracture systems.

According to the present invention, a semi-analytic model has been derived which describes the behaviour of a set of planar interacting faults, where there is shear slippage somewhere in the system, and the model has been validated using a case study from a Cotton Valley stimulation.

Once the deformation mechanism of a fault or fracture has been predicted from the above modelling, it is possible to use the prediction to disambiguate the measured microseismic data to more tightly constrain or even fully determine the moment tensor.

This allows a full picture to be obtained of how hydrofractures have developed and how they interact with natural fracture systems, to assist in planning of future drilling and/or hydrofracturing and to ensure that reservoirs are exploited to their full capacity in the most cost effective manner. Jechumtalova and Eisner ("Non-double-couple seismic events induced by hydraulic fracturing observed from a linear array of receivers," Proceedings of the 70$^{th}$ EAGE Conference & Exhibition, Rome, Italy, Jun. 9-12, 2008) showed that a vertical array of receivers in a 1-D isotropic medium does not allow all six components of the moment tensor to be determined. It is only possible to invert for five components of the moment tensor in a specially orientated coordinate system. If additional information on a possible source mechanism is available, as detailed here, then it is possible to determine all six components of the moment tensor.

The present invention also allows for the possibility of manipulating the behaviour of natural fracture systems in the vicinity of hydrofractures, which are important for productivity in some environments. Relatively slow propagation of hydrofractures may allow additional shear deformation in adjacent natural fracture systems, which may beneficially increase their hydraulic conductivity.

The invention claimed is:

1. A method of subsurface imaging using microseismic data obtained during a hydrofracturing procedure, comprising:

processing a predicted deformation mechanism for an existing fracture in a subsurface medium prior to the hydrofracturing procedure, wherein fracture geometry, mechanical properties of the subsurface medium and in-situ stress states in the subsurface medium are used to model behaviour of the fracture and process the predicted deformation mechanism of the fracture;

receiving the microseismic data produced by hydrofracturing of the subsurface medium, wherein the hydrofracturing of the subsurface medium is produced by the hydrofracturing procedure and the hydrofracturing procedure comprises pumping a fluid down a well into the subsurface medium, and wherein the microseismic data comprises data generated by changes in properties of the fracture including movement and/or failure of the fracture as a result of the fluid being pumped into the subsurface medium; and using a processor to process the received microseismic data, wherein the processing of the microseismic data comprises using the predicted deformation mechanism to interpret the received microseismic data to determine the changes in the properties of the fracture produced by the hydrofracturing.

2. The method of claim 1, wherein the processing a predicted deformation mechanism takes into account effects of an adjacent fracture on the predicted deformation mechanism.

3. The method of claim 1, wherein the fracture is modelled as a slot in an elastic material.

4. The method of claim 3, wherein the fracture is modelled as the sum of an empty slot loaded by far field stresses and a slot loaded internally by normal and shear stresses.

5. The method of claim 4, wherein the slot is divided into sections, each section having its own internal normal and shear stresses.

6. The method of claim 1, wherein the mechanical properties of the subsurface medium comprise elastic properties and failure properties and the in-situ stress states in the subsurface medium comprises the total in-situ stress state and pore pressure of the medium.

7. The method of claim 1, wherein the determined changes in the properties of the fracture produced by the hydrofracturing comprise changes in a moment tensor for the fracture.

8. The method of claim 1, further comprising providing sensors and recording seismic signals caused by movement of the fracture to obtain the microseismic data.

9. The method of claim 8, wherein the sensors are provided in a borehole, on the earth's surface or on the seabed, or any combination of these three.

10. The method of claim 1, further comprising using the determined changes in the properties of the fracture to modify the hydrofracturing procedure.

11. The method of claim 1 wherein the using the predicted deformation mechanism to interpret the received microseismic data comprises using the predicted deformation mechanism to rule out non-plausible deformation scenarios for the fracture.

12. The method of claim 1 wherein the determined changes in the properties of the fracture are used to produce an image of the fracture.

* * * * *